United States Patent
Lee (10) Patent No.: US 8,457,702 B2
(45) Date of Patent: Jun. 4, 2013

(54) CRADLE FOR A PORTABLE TERMINAL

(76) Inventor: Jae Gab Lee, Gyeongsangbuk-do (KR)

( * ) Notice: Subject to any disclaimer, the term of this patent is extended or adjusted under 35 U.S.C. 154(b) by 0 days.

(21) Appl. No.: 13/392,093

(22) PCT Filed: Aug. 25, 2010

(86) PCT No.: PCT/KR2010/005693
§ 371 (c)(1),
(2), (4) Date: Feb. 24, 2012

(87) PCT Pub. No.: WO2011/037324
PCT Pub. Date: Mar. 31, 2011

(65) Prior Publication Data
US 2012/0178507 A1    Jul. 12, 2012

(30) Foreign Application Priority Data

Sep. 28, 2009  (KR) .................. 20-2009-0012690 U
Mar. 5, 2010   (KR) ........................ 10-2010-0019848

(51) Int. Cl.
*H04M 1/00* (2006.01)
(52) U.S. Cl.
USPC ....... 455/575.8; 455/90.3; 455/347; 455/348; 455/575.1; 455/550.1

(58) Field of Classification Search
USPC ................. 455/575.8, 550.1, 90.3, 347, 348, 455/575.1
See application file for complete search history.

(56) References Cited

U.S. PATENT DOCUMENTS

| 6,647,248 | B1 * | 11/2003 | Ortscheid et al. | .......... 455/575.1 |
| 8,051,980 | B2 * | 11/2011 | Tai et al. | ........................ 206/320 |
| 2005/0009587 | A1 * | 1/2005 | Lee | .............. 455/575.8 |
| 2008/0032758 | A1 * | 2/2008 | Rostami | ..................... 455/575.8 |
| 2009/0111543 | A1 * | 4/2009 | Tai et al. | ..................... 455/575.8 |
| 2009/0325657 | A1 * | 12/2009 | Ramsdell et al. | .......... 455/575.8 |

* cited by examiner

*Primary Examiner* — Olumide T Ajibade Akonai (57) ABSTRACT

A cradle for a portable terminal is provided. The portable terminal has a large display unit. The cradle for a portable terminal includes a body member an upper surface of which has an accommodating groove for accommodating a portable terminal, and one end side thereof having a first hinge portion; a flip member having one end side thereof having second hinge portion to be coupled to the first hinge portion, and one surface of the flip member rotating relative to the body member so as to close the upper surface of the portable terminal; and a rotating member having one end installed in the first hinge portion and the other end thereof being installed in the second hinge portion so as to couple the flip member to the body member such that the flip member is rotatable.

5 Claims, 7 Drawing Sheets

CRADLE FOR A PORTABLE TERMINAL

CROSS-REFERENCE(S) TO RELATED APPLICATIONS

The present invention claims priority of PCT/KR2010/005693, filed on Aug. 25, 2010 (which is assigned with a priority of Korean Patent Application No. 20-2009-0012690, filed on Sep. 28, 2009) which is incorporated herein by reference.

BACKGROUND OF THE INVENTION

1. Field of the Invention

The present invention relates to a cradle for a portable terminal, and particularly, to a cradle for a portable terminal, which accommodates the portable terminal having a large display unit to protect the display unit and also to support the portable terminal such that the portable terminal is inclined.

2. Description of Related Art

Today, technologies of radio communication has greatly improved and its market share also expands to substitute wire communication. A terminal as a radio communication device has been developed as a high-tech electronic product having various designs and functions due to advancement in communication technology.

Terminals, such as "portable phones", "hand phones", "cellular phones" and "mobile phones" are carried by users during most of daily lifes, becomes smaller and more precise, and thus it is required that the terminal has high durability, shock resistance and water-proof property.

To this end, a portable terminal protection case formed of vinyl, artificial leather, plastic and the like is used widely.

Recently, a display unit of the portable terminal becomes larger and a bar type full-touch mobile phone (called a "touch phone") which provides a touch type display unit instead of a keyboard is used widely. Therefore, since the touch display unit is high price, it is necessary to provide a protection case for efficiently protecting damage and scratches due to external shock.

If the touch phone is carried in a pocket without the protection case, it may malfunction because the display unit is exposed to the outside, and also since a voice is leaked under the mouth upon the mobile phone conversation, the conversation voice may be lowered. Furthermore, when watching videos or listening music, the portable phone can be erected only by using peripheral natural or artificial features.

SUMMARY OF THE INVENTION

An embodiment of the present invention is directed to providing a cradle for a portable terminal, which accommodates a bar type portable terminal (called the "touch phone") to prevent malfunction of the portable terminal due to undesirable external pressing of a display unit, to prevent leakage of conversation voice upon the mobile phone conversation and also to support the portable terminal such that the portable terminal is inclined.

To achieve the object of the present invention, the present invention provides a cradle for a portable terminal, including a body member, an upper surface of which has an accommodating groove for accommodating a portable terminal, and one end side of which has a first hinge portion; a flip member, one end side of which has a second hinge portion to be coupled to the first hinge portion, and one surface of which rotates relative to the body member so as to close the upper surface of the portable terminal; and a rotating member, one end of which is installed in the first hinge portion and the other end of which is installed in the second hinge portion so as to couple the flip member to the body member such that the flip member is rotatable, wherein, when the flip member rotates more than 270 degrees, the other surface of the flip member is brought into contact with the body member to form an acute angle between the other surface of the flip member and the body member and thus to prevent further rotation of the flip member.

Preferably, the first hinge portion is formed into two parts which are disposed at one end side of the body member so as to spaced apart from each other, and the second hinge portion which is formed at one end side of the flip member is disposed between the two parts of the first hinge portion, which are spaced apart from each other, and a width of the flip member is formed to be larger than a vacant space between the two parts of the first hinge portion such that both sides of the flip member are contacted with a lower surface of the body member so as to support body member when the flip member is rotated.

Preferably, the second hinge portion is formed into two parts which are disposed at one end side of the flip member so as to spaced apart from each other, and the first hinge portion which is formed at one end side of the body member and disposed between the two parts of the second hinge portion, which are disposed to be spaced apart from each other.

Preferably, a width of the flip member is smaller than a width of the body member.

Preferably, a first hooking portion for fixing the portable terminal is formed at one side of the body member so as to be protruded upward, and a second hooking portion for fixing the portable terminal is formed at the other side of the body member so as to be protruded upward, and at least one of the first and second hooking portions is formed to cover side and upper surfaces of a corner portion of the portable terminal.

Preferably, the rotational member applies rotational force to the flip member such that the flip member is rotated toward an upper surface of the portable terminal when the flip member covers the upper surface of the portable terminal, and if the flip member is rotated more than 90 degrees by external force, the rotational member applies the rotational force to the flip member such that the flip member is semi-automatically rotated up to 180 degrees, and if the flip member is rotated more than 270 degrees by external force, the rotational member applies the rotational force to the flip member such that the flip member is rotated to an opposite direction to the upper surface of the portable terminal.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
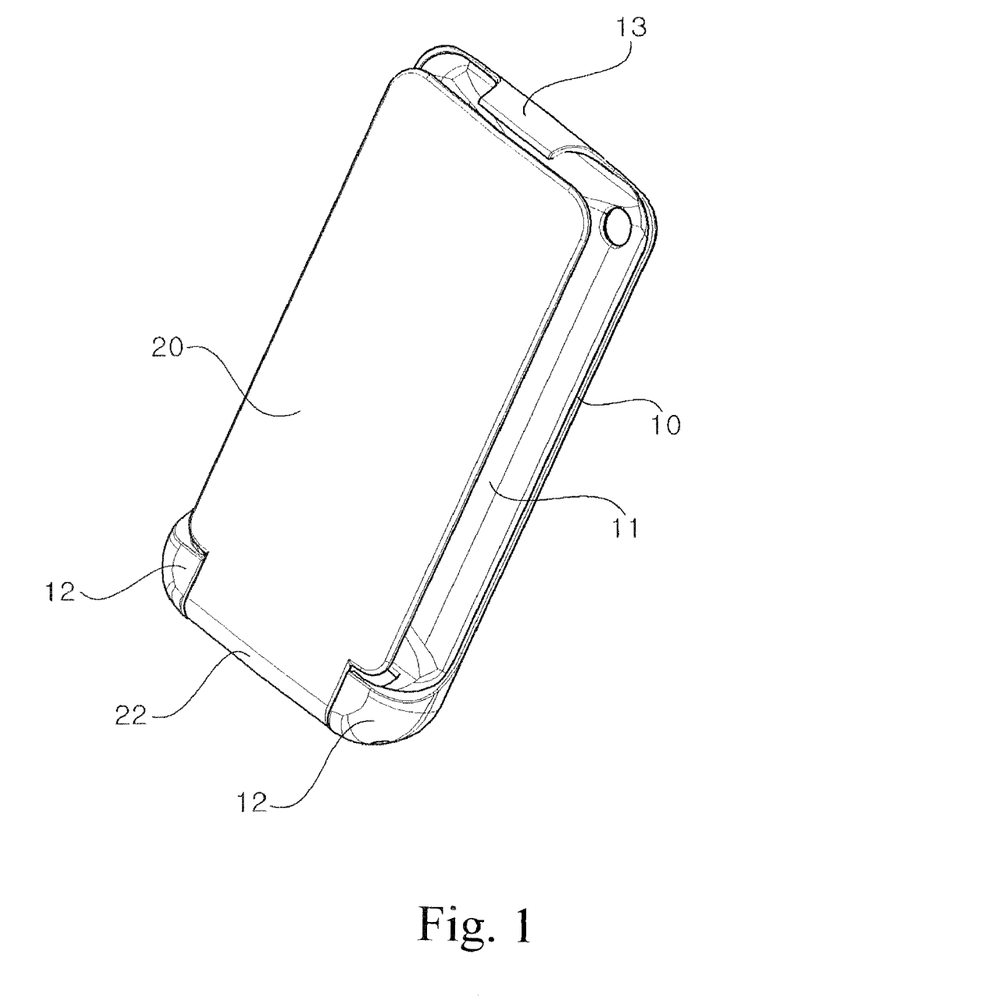
FIG. 1 is a perspective view showing a state that a cradle for a portable terminal is closed according to an embodiment of the present invention.
Figure 2:
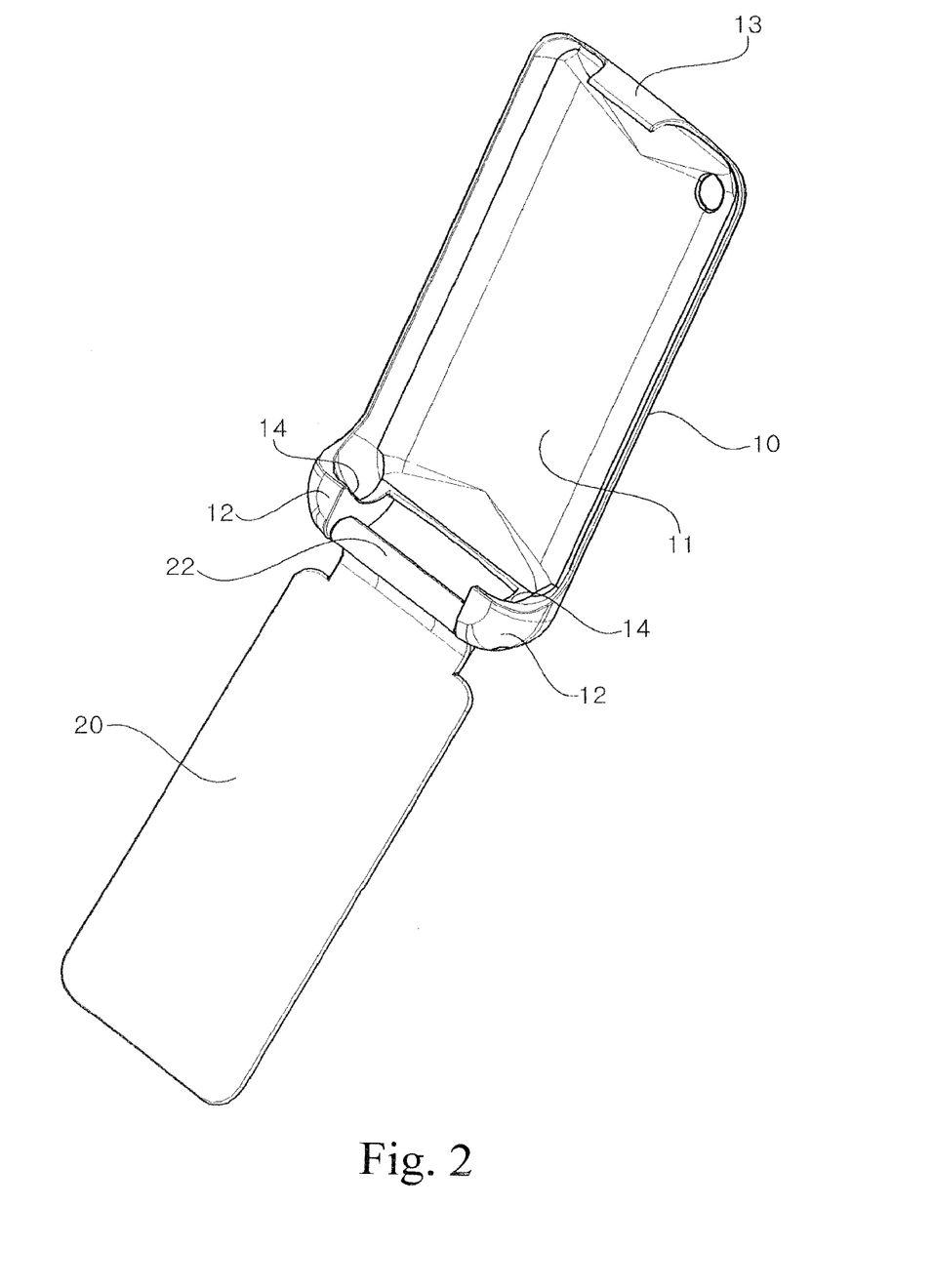
FIG. 2 is a perspective view showing a state that the cradle is opened according to the embodiment of the present invention.
Figure 3:
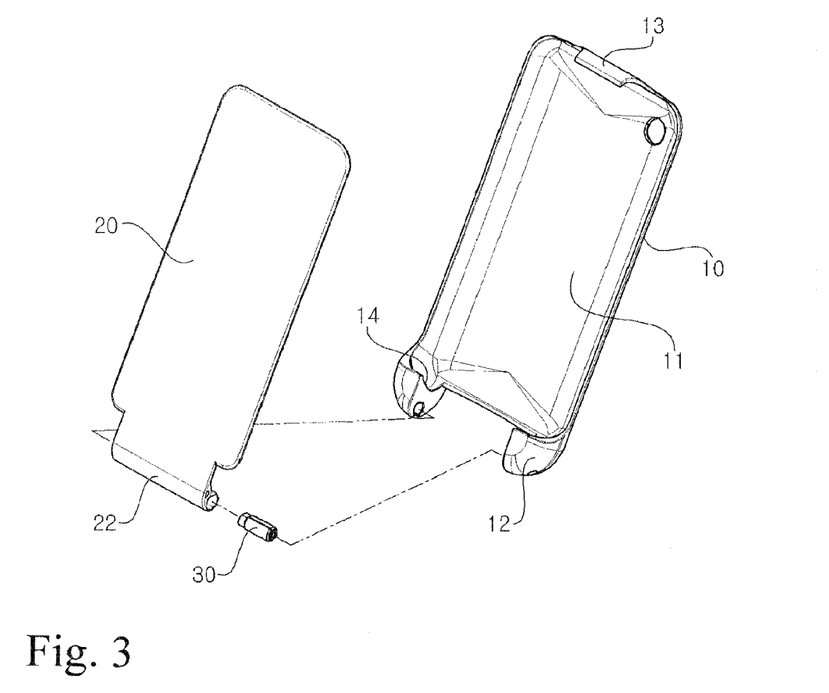
FIG. 3 is an exploded perspective view of the cradle according to the present invention.
Figure 4:
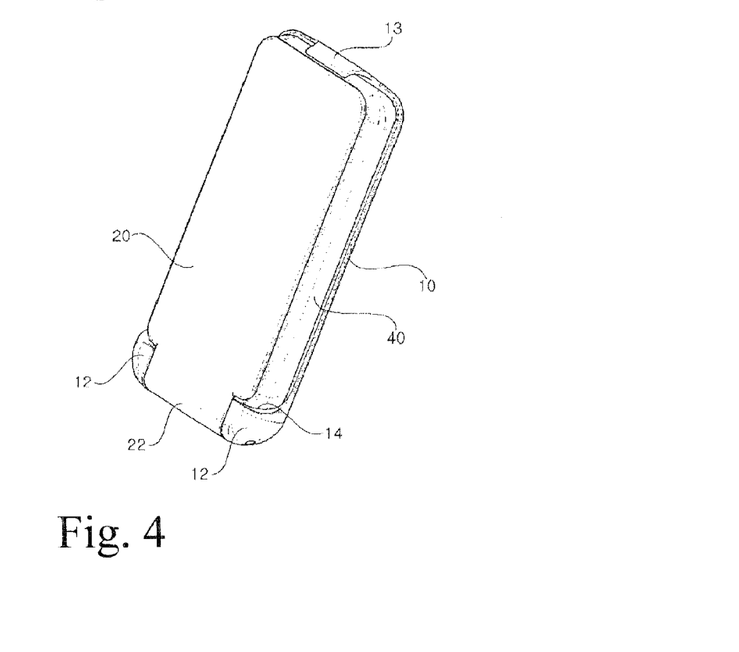
FIG. 4 is a perspective view showing a state that the portable terminal is accommodated in the cradle according to the embodiment of the present invention.

FIG. 1 is a perspective view showing a state that a cradle for a portable terminal is closed according to an embodiment of the present invention, FIG. 2 is a perspective view showing a state that the cradle is opened according to the embodiment of the present invention, FIG. 3 is an exploded perspective view of the cradle according to the present invention, and FIG. 4 is a perspective view showing a state that the portable terminal is accommodated in the cradle according to the embodiment of the present invention.

As shown in FIGS. 1 to 4, a cradle for a portable terminal according to the present invention includes a body member 10, a flip member 20 and a rotating member 30.

The body member 10 is formed of a synthetic resin, a metallic material or the like. An accommodating groove 11 is formed in an upper surface of the body member 10 so as to accommodate the portable terminal 40, as shown in FIG. 4.

A first hinge portion 12 is formed at one end side of the body member so as to be protruded to an outside.

The first hinge portion 12 is formed into two parts, and the two parts are spaced apart from each other.

In other words, the two parts of the first hinge portion 12 are spaced apart from each other such that a vacant space is formed therebetween.

And a first hooking portion 13 for fixing the portable terminal 40 is formed at one side of the body member 10 so as to be protruded upward, and a second hooking portion 14 for fixing the portable terminal 40 is formed at the other side of the body member 10 so as to be protruded upward.

At least one of the first and second hooking portions 13 and 14 is formed to cover side and upper surfaces of a corner portion of the portable terminal 40.

In the embodiment, the first hooking portion 13 is formed into one part, and the second hooking portion 14 is formed into two parts formed at the first hinge portion 12.

The first hooking portion 13 is curved so as to provide elastic force, and the second hooking portion 14 is formed to be recessed in the first hinge portion 12.

As shown in FIG. 4, the first hooking portion 13 covers the side surface of the portable terminal 40, and the corner portion of the terminal portion 40 is receipted in the second hooking portion 14 so that the second hooking portion 14 covers the side and upper surfaces of the portable terminal 40.

Therefore, while the portable terminal 40 is accommodated in the accommodating groove 11, the side and/or upper surface of the portable terminal 40 is fixedly maintained by the first and second hooking portions 13 and 14.

The flip member 20 is formed into a synthetic resin, a metallic material or the like, and a second hinge portion 22 is formed at one end side of the flip member 20 so as to be hingedly coupled to the first hinge portion 12.

The flip member 20 is rotated relative to the body member 20 so that an upper surface of the portable terminal 40 receipted in the body member 10 is opened and closed.

The second hinge portion 22 is formed at one end side of the flip member 10 and also disposed between the two parts of the first hinge portion 12, which are disposed to be spaced apart from each other.

When the flip member 20 rotates more than 270 degrees, the other surface of the flip member 20 is brought into contact with the body member 10 so as to form an acute angle between the other surface of the flip member 20 and the body member 10, thereby preventing further rotation of the flip member 20.

A width of the second hinge portion 22 is formed to be smaller than that of the flip member 20, and the width of the flip member 20 is formed to be larger than the space between the two parts of the first hinge portion 12, which are spaced apart from each other.

Figure 7:
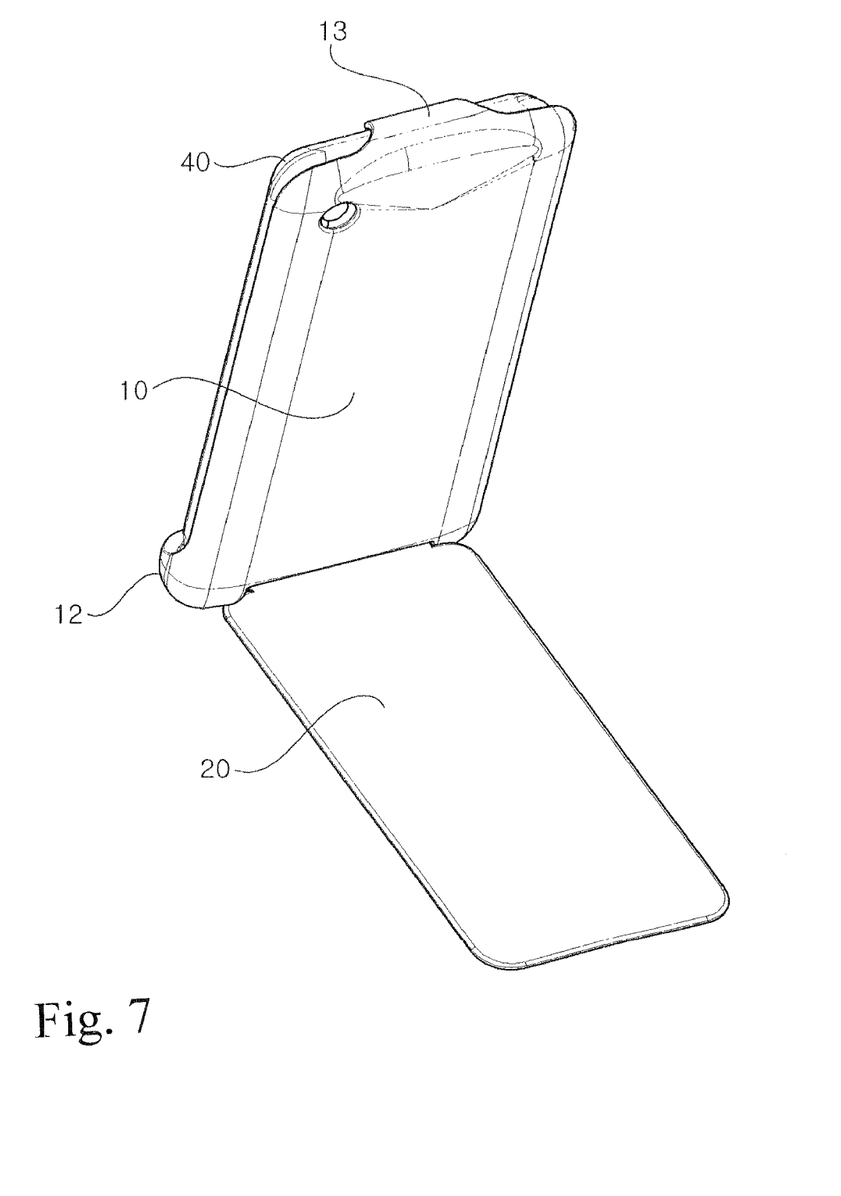
FIG. 7 is another perspective view showing the state that the flip member in FIG. 5 is further rotated so as to use as the stand according to the embodiment of the present invention.

Therefore, as shown in FIG. 7, when the flip member 20 is rotated, both sides of the flip member 20 are contacted with a lower surface of the body member 10 so as to stably support the body member 10.

Further, the width of the flip member 20 is formed to be smaller than that of the body member 10 so that the flip member 20 stably supports the portable terminal 40 accommodated in the body member 10 when the cradle 40 for a portable terminal is erected longitudinally as shown in FIG. 8b.

Alternatively, only one first hinge portion 12 may be formed at the body member 10, and two second hinge portions 13 may be formed at the flip portion 20, such that the first hinge portion 12 is disposed between the second hinge portions 22.

One end of the rotating member 30 is installed in the first hinge portion 12 and the other end thereof is installed in the second hinge portion 22 so as to rotatably couple the flip member to the body member.

The rotating member 30 may be formed into a rotational shaft for rotatably connecting the body member 10 and the flip member 20 such that a user can manually rotates the flip member 20. Otherwise, the rotating member 30 may be formed so that the flip member 20 is semi-automatically rotated relative to the body member 10.

Preferably, the rotating member 30 is formed so that the flip member 20 is semi-automatically rotated relative to the body member 10.

In case that the flip member 20 is formed to be semi-automatically rotated, rotational force is applied such that the flip member 20 is rotated toward an upper surface of the portable terminal 40 when the flip member 20 covers the upper surface of the portable terminal 40. And when the flip member is rotated more than 90 degrees by external force, the rotational force is semi-automatically applied such that the flip member 20 is rotated up to 180 degrees. When the flip member 20 is rotated more than 270 degrees by the external force, the rotational force is applied such that the flip member 20 is rotated to an opposite direction to the upper surface of the portable terminal 40.

Such the semi-automatic rotation of the rotating member 30 can be achieved by a conventional cam coupling structure.

More detailedly, the rotating member 30 includes a first cam portion which has two first curved portions disposed at 180 degrees, a second cam portion which has two second curved portions formed at one surface thereof contacted with an surface of the first cam portion, and a spring which elastically supports the first cam portion toward the second cam portion.

By such the construction, when the external force is not applied, the first and second curved portions are disposed at 90 degrees, and when the external is applied, the second cam portion is rotated at about 90 degrees and thus arrived at the first cam portion, and then the second curved portion is semi-automatically rotated up to 180 degrees by elastic force of the compressed spring.

And if the second curved portion is rotated from 180 degrees to 270 by the above-mentioned operation, the second curved portion is semi-automatically rotated from 270 degrees to 360 degrees.

Therefore, the rotating member 30 can semi-automatically apply the rotational force to the flip member 20.

Furthermore, a cover (not shown) formed of a soft material (vinyl, leather or the like) is integrally attached to an outside of the body member 10 and an outside of the flip member 20 so that a connection portion of the body member 10 and the flip member 20 is not exposed to an outside, thereby improving appearance thereof. And a new design may be applied to surfaces of the body member 10 and the flip member 20 through a post-process.

Hereinafter, the operation of the present invention will be described fully.

Figure 5:
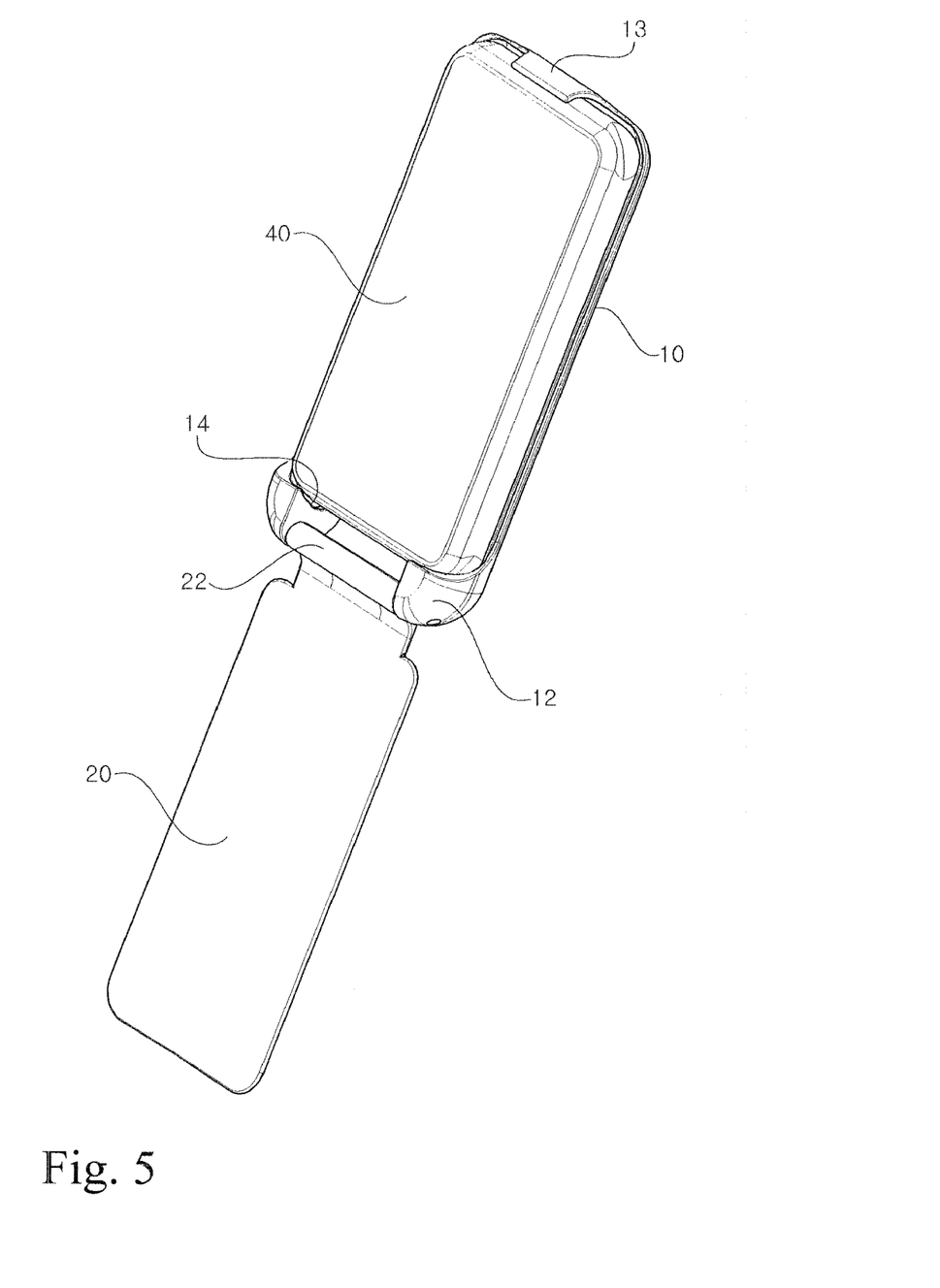
FIG. 5 is a perspective view showing a state that a flip member in FIG. 4 is rotated so as to open the portable terminal according to the embodiment of the present invention.
Figure 6:
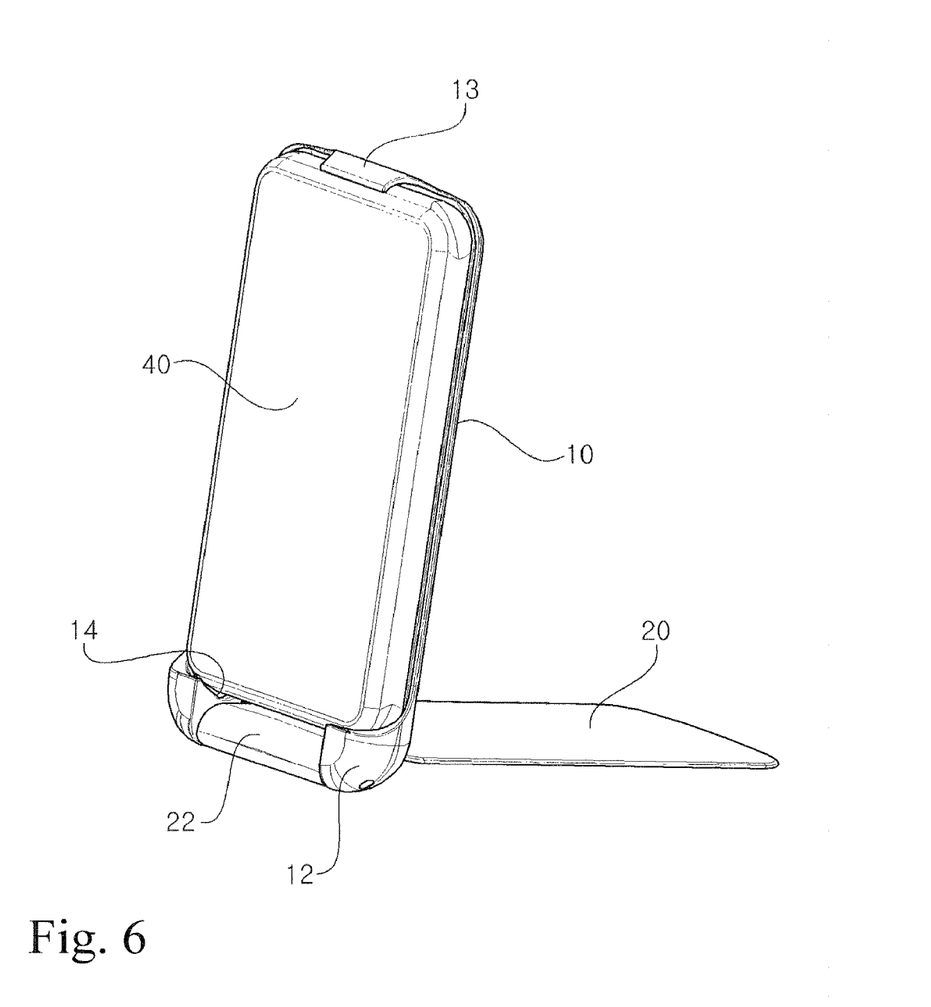
FIG. 6 is a perspective view showing a state that the flip member in FIG. 5 is further rotated so as to use as a stand according to the embodiment of the present invention.
Figure 8:
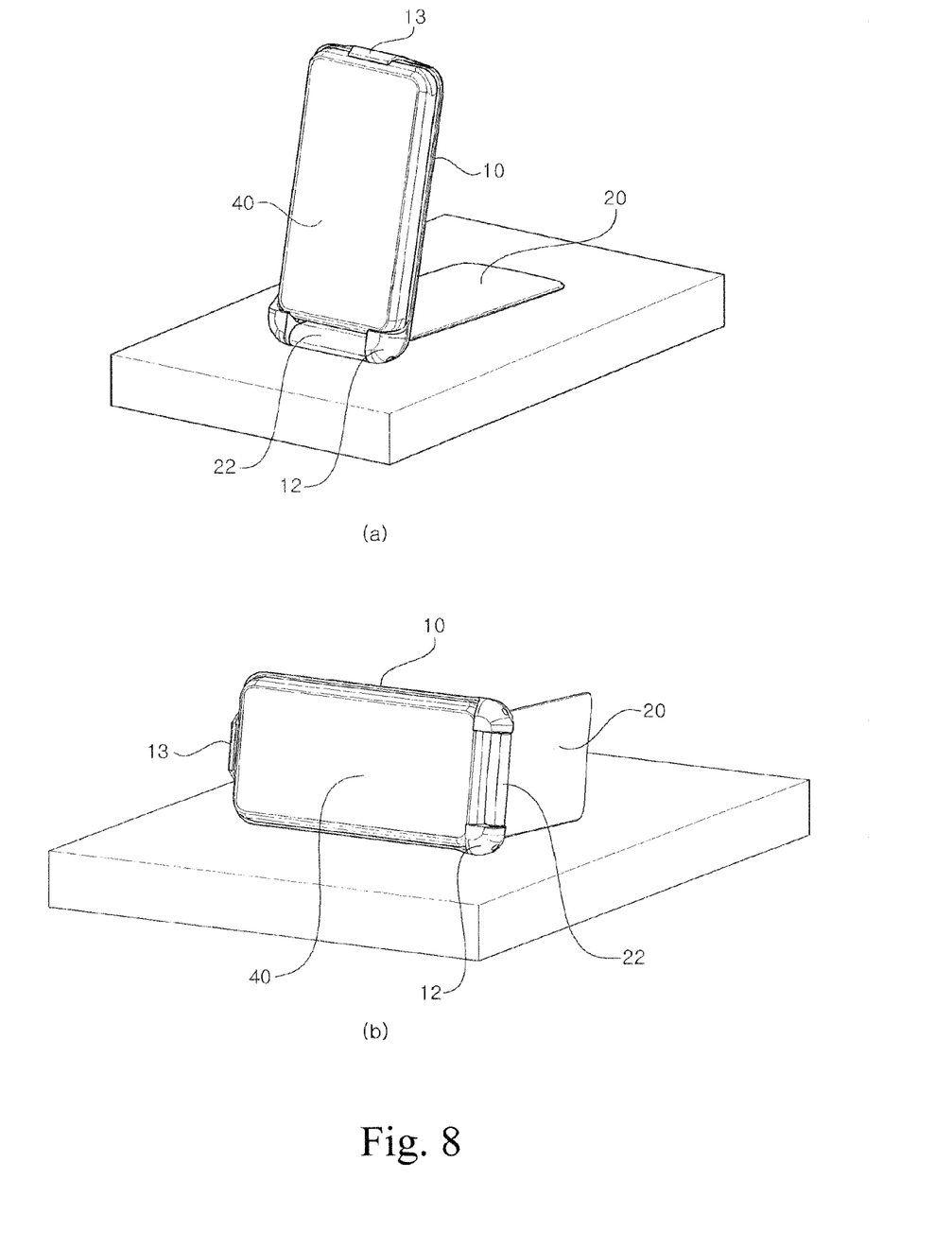
FIG. 8 is a perspective view showing that the cradle of FIGS. 6 and 7 is used as the stand.

FIG. 5 is a perspective view showing a state that the flip member 20 in FIG. 4 is rotated so as to open the portable terminal 40 according to the embodiment of the present invention, FIG. 6 is a perspective view showing a state that flip member 20 in FIG. 5 is further rotated so as to use as a stand according to the embodiment of the present invention, FIG. 7 is another perspective view showing the state that the flip member 20 in FIG. 5 is further rotated so as to use as the stand according to the embodiment of the present invention, and FIG. 8 is a perspective view showing that the cradle of FIGS. 6 and 7 is used as the stand.

As shown in FIG. 4, in a state that the portable terminal 40 is accommodated in the accommodating groove 11 of the body member 10, the portable terminal 40 is fixed to the body member 40 by first and second hooking portions 13 and 14.

The rotational force of the rotating member 30 is applied to the flip member 20 such that the flip member 20 is rotated to cover the upper surface of the portable terminal 40, and thus, in a normal state that the external force is not applied, the flip member 20 is maintained to cover the upper surface of the portable terminal 40.

Of course, in case that the rotating member 30 is formed to be rotated manually, a separate locking unit (not shown) for adapting the flip member 20 to cover the upper surface of the portable terminal 40 is needed.

Therefore, it is possible to prevent malfunction of the portable terminal 40 due to undesirable external pressing of a display unit when the portable terminal 40 is carried in a pocket.

When it is intended to rotate the flip member 20 and thus open the upper surface of the portable terminal 40, the member 20 is rotated relative to the body member 20, as shown in FIG. 5.

If the flip member 20 is rotated more than 90 degrees by the external force, the flip member 20 is semi-automatically rotated up to 180 degrees due to the rotational force generated at the rotating member 30, such that the portable terminal 40 is opened.

In this situation, it is possible to perform the communication using the external terminal 40 and also to prevent leakage of a voice upon the mobile phone conversation using the flip member 20, thereby achieving smooth communication.

Furthermore, when watching videos through the portable terminal 40, it is preferable that the portable terminal 40 is supported to be inclined.

Therefore, in this case, the flip member 20 is rotated more than 270 degrees, as shown in FIGS. 6 and 7.

In case that the flip member 20 is rotated from 180 degrees to 270 degrees by the external force and thus the rotating member 30 is rotated, if the flip member 20 is rotated more than 270 degrees, the rotational force of the rotating member 30 is applied to the flip member 20 so that the flip member 20 is rotated to a lower surface of the body member 10, i.e., the upper surface of the portable terminal 40.

Therefore, the flip member 20 is rotated more than 270 degrees, and then if the other surface of the flip member 20 is contacted with the body member 10, the rotation thereof is stopped.

As shown in FIG. 7, since the width of the flip member 20 is larger than the vacant space between the two parts of the first hinge portion 12, both sides of the flip member 20 are contacted with the lower surface of the body member 10 so as to increase a contacting surface area with the body member 10, thereby stably supporting the body member 10.

At this time, since the rotational force of the rotating member 30 is continuously applied to the flip member 20, the flip member 20 can be maintained in the state shown in FIGS. 6 and 7.

As shown in FIGS. 6 and 7, when the flip member 20 is rotated more than 270 degrees, the portable terminal 40 can be erected to be inclined, thereby providing convenience to the user when watching videos and the like.

FIG. 8a shows that the flip member 20 is disposed to be opposed to a bottom surface and thus used as a stand for arranging the body member 10 and the portable terminal 40 to be inclined.

Herein, since the both sides of the flip member 20 are contacted with body member 10, the contacting surface area with the body member 10 is increased, thereby stably supporting the body member 10.

FIG. 8b shows that a side surface of the flip member 20 and a side surface of the body member 10 are disposed to be in contact with the bottom surface and thus used as the stand for arranging the body member 10 and the portable terminal 40 to be inclined.

Herein, since the width of the flip member 20 is smaller than that of the body member 10, the body member 10 and the portable terminal 40 are laid toward the flip member 20 and thus included by the flip member 20.

If the body member 10 and the flip member 20 have the same width, the body member 10 may be laid to an opposition direction to the flip member 20. However, in the present invention, since the width of the flip member 20 is smaller than that of the body member 10, the body member 10 is laid toward the flip member 20, and thus the body member 10 in which the portable terminal 40 is installed can be stably supported.

According to the present invention, the cradle for a portable terminal is accommodated in the bar type portable terminal (called the "touch phone") having a large display unit to prevent malfunction of the portable terminal due to the undesirable external pressing of a display unit, to prevent the leakage of conversation voice upon the mobile phone conversation and also to support the portable terminal such that the portable terminal is inclined.

While the present invention has been described with respect to the specific embodiments, it will be apparent to those skilled in the art that various changes and modifications may be made without departing from the spirit and scope of the invention as defined in the following claims.

Further, the present invention can be applied to the cradle for a portable terminal so as to protect the display unit and also to support the portable terminal such that the portable terminal is inclined, thereby providing convenience to the user.

What is claimed is:

1. A cradle for a portable terminal, comprising:
   a body member, an upper surface of the body member having an accommodating groove for accommodating a portable terminal, and one end side of the body member having a first hinge portion;
   a flip member, one end side of the flip member having a second hinge portion to be coupled to the first hinge portion, and one surface of the flip member being rotatble relative to the body member to close the upper surface of the portable terminal; and
   a rotating member, one end of the rotating member being installed in the first hinge portion and the other end thereof being installed in the second hinge portion so as to couple the flip member to the body member such that the flip member is rotatable,
   wherein, when the flip member rotates through more than 270 degrees, the other surface of the flip member is brought into contact with the body member to form an acute angle between the other surface of the flip member and the body member and thus to prevent the flip member from over-rotation; and
   wherein the rotational member applies rotational force to the flip member such that the flip member is rotated toward an upper surface of the portable terminal when the flip member covers the upper surface of the portable terminal, and if the flip member is rotated more than 90 degrees by an external force, the rotational member applies the rotational force to the flip member such that the flip member is semi-automatically rotated up to 180 degrees, and if the flip member is rotated more than 270 degrees by the external force, the rotational member applies the rotational force to the flip member such that the flip member is rotated to an opposite direction to the upper surface of the portable terminal.

2. The cradle of claim 1, wherein the first hinge portion is formed into two parts which are disposed at the end side of the body member so as to be spaced apart from each other, and the second hinge portion formed at one end side of the flip member is disposed between the two parts of the first hinge portion, which are spaced apart from each other, and a width of the flip member being larger than a vacant space between the two parts of the first hinge portion such that both sides of the flip member are contacted with a lower surface of the body member so as to support the body member when the flip member is rotated.

3. The cradle of claim 1, wherein the second hinge portion is formed into two parts; these two parts are disposed at one end side of the flip member so as to be spaced apart from each other, and the first hinge portion is formed at one end side of the body member and disposed between the two parts of the second hinge portion.

4. The cradle of claim 1, wherein a width of the flip member is smaller than a width of the body member.

5. The cradle of claim 1, wherein a first hooking portion for fixing the portable terminal is formed at one side of the body member and to protrudes upward, and a second hooking portion for fixing the portable terminal is formed at the other side of the body member and protrudes upward, and at least one of the first and second hooking portions is formed to cover side and upper surfaces of a corner portion of the portable terminal.

* * * * *